United States Patent Office 2,910,971
Patented Nov. 3, 1959

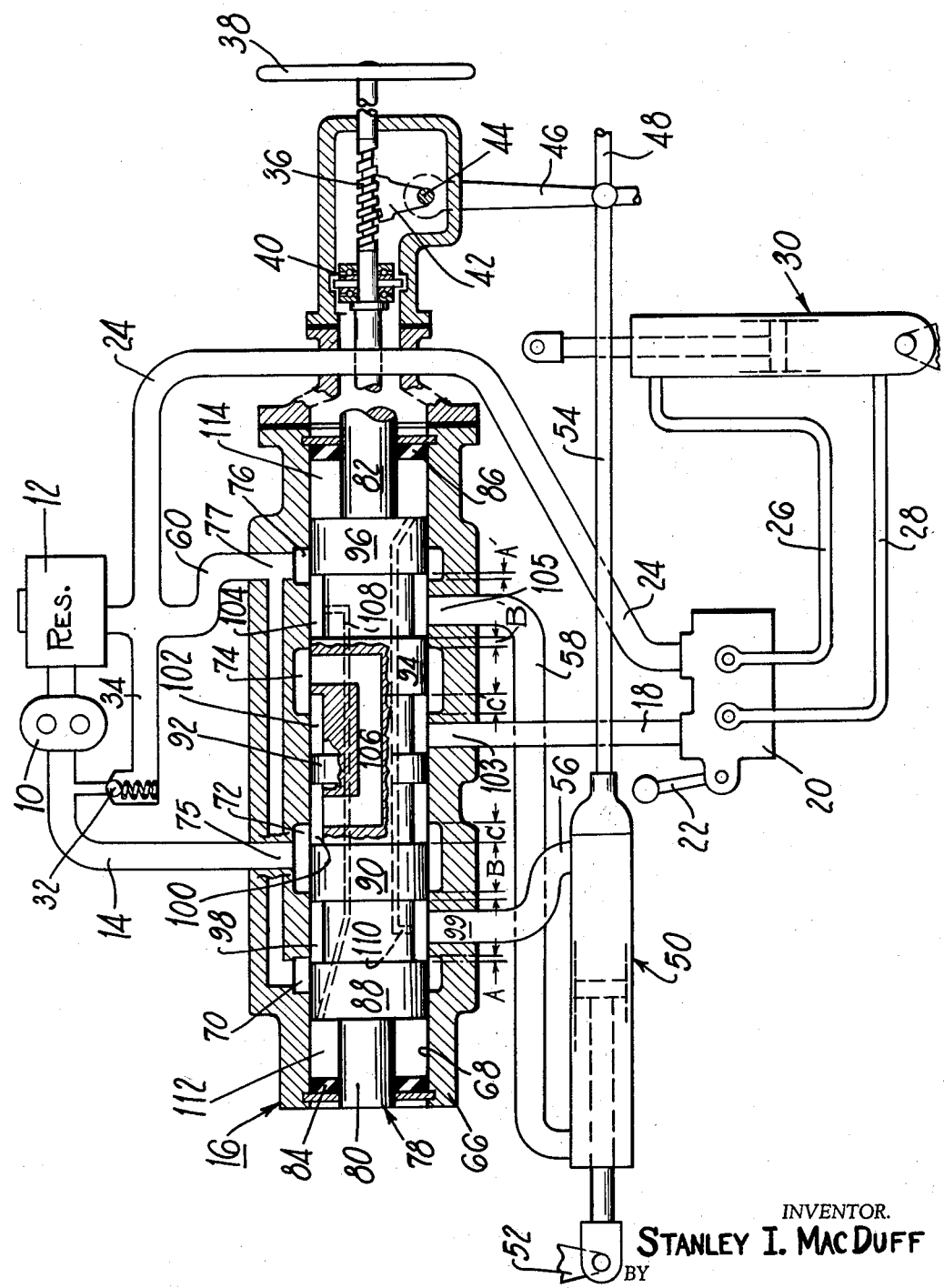

2,910,971

POWER STEERING VALVE

Stanley I. MacDuff, South Bend, Ind., assignor to Bendix Aviation Corporation, South Bend, Ind., a corporation of Delaware Application June 27, 1958, Serial No. 744,991

5 Claims. (Cl. 121—46.5)

This invention relates to power steering valves and more particularly to a power steering valve for use in series with a lift system on a farm tractor or similar vehicle.

In the past various types of systems have been used on vehicles to operate a given combination of hydraulic devices from a single pump. However, most of these systems have required increased pump pressure and/or flow capacities and have used additional equipment such as flow dividers and supplementary relief valves in various combinations to achieve the desired end results. These results, in many instances, have been rather costly, to say the least, and have had many shortcomings.

It is therefore an object of this invention to provide a combined power steering and tractor lift system which will not require any auxiliary equipment other than the equipment normally associated with each individual system.

More specifically, it is an object of this invention to provide a power steering valve which may be incorporated into existing tractor lift systems without modifying the basic design details of the lift system.

Another object of this invention is to provide a combination open-closed center steering valve which may be used in series with a tractor lift system in such a manner that it is open center with respect to the lift system, but is closed center with respect to the power steering system. A further object of this invention is to provide a combination open-closed center steering valve which will permit effective operation of the steering system alone or simultaneously with the operation of the lift system.

A still further object of this invention is to provide a closed center power steering control valve for use in series with an open center auxiliary hydraulic system such as a tractor lift system, which valve incorporates means for sequentially closing communication between one of the cylinder ports and the return port, opening communication between the inlet port and the particular cylinder port, and closing communication between the inlet port and the flow through port, which latter port communicates with an auxiliary valve such as a lift control valve, said communication between the inlet port and flow through port being closed off only if no effective pressure exists therebetween.

The above and other objects and features of the invention will become apparent from the following description of the device taken in connection with the accompanying drawing which forms a part of this specification and in which the single figure illustrates a sectional view of a steering valve embodying the principles of the present invention shown in conjunction with the hydraulic system utilized therewith.

The basic hydraulic system consists of a pump 10, which receives hydraulic fluid from a reservoir 12 and delivers it through a conduit 14 to the steering valve 16. The fluid leaves the steering valve through a conduit 18 leading to a four-way open center lift control valve 20, which may be manually operated by handle 22. This open center valve 20 may be of any well known construction and will not be described in detail, since it forms no part of the present inevntion. Conduit 24 provides for return flow from the lift valve to the reservoir. The lift valve is connected by a pair of conduits 26 and 28 to a lift cylinder 30, which will be connected to the mechanism to be lifted in the usual manner. The system may be provided with a relief valve 32 which will return the fluid to the reservoir through a conduit 34. The relief valve may be set at any desired maximum pressure at which the system would be designed to operate.

The steering valve is designed to be operated by the end thrust of a worm 36 comprising a portion of a steering gear which may be manually operated by steering wheel 38 mounted on the worm shaft. Suitable thrust bearing 40 having a limited axial motion in a housing will take the thrust of the worm when manual operation of the steering gear is required due to the failure of the hydraulic system. The worm may operate a conventional sector 42 mounted upon a sector shaft 44 upon which the pitman arm 46 may also be mounted. The pitman arm 46 is connected to the steering linkage in the usual manner through a drag link 48. A power steering cylinder 50 may be anchored to the vehicle frame at 52 and connected by rod 54 to the steering linkage. Fluid for operating this cylinder is conducted from the steering valve 16 to the power cylinder through conduits 56 and 58. The steering valve is also provided with a separate return to the reservoir through conduit 60.

The steering valve 16 comprises a housing 66 having a bore 68 formed therein. Formed in the bore is a first return annular channel 70, a first flow through annular channel 72 a second flow through annular channel 74, and a second return annular channel 76. Channel 72 communicates with an inlet port 75, while channels 70 and 76 communicate with a return port 77. Closely fitted within the bore 68 is valve spool 78 having reduced diameter end portions 80 and 82. Seals 84 and 86 are installed between the reduced diameter end portions and the housing and are suitably secured to the valve housing. Formed on valve spool 78 are five lands which may be designated as follows: a first return land 88, a first flow through and metering land 90, a separator land 92, a second flow through and metering land 94, and a second return land 96. These five lands form four annular channels therebetween which may be designated as a first cylinder annular channel 98, a first inlet annular channel 100, a second inlet annular channel 102, and a second cylinder annular channel 104. Channel 98 communicates with cylinder port 99, channel 102 communicates with flow through port 103 and channel 104 communicates with cylinder port 105. A passage 106 is suitably formed through the spool and extends from the first inlet channel 100 formed on the valve spool to the second flow through channel 74 formed in the bore 68 of the housing. Drilled passages 108 and 110 communicate chambers 112 and 114 respectively with the first and second cylinder channels 104 and 98 in order to provide the steering valve with pressure reaction.

Certain space relationships A, B and C, as shown on the drawing, are provided by proportioning the width of the above mentioned lands and grooves with the space A being between the first return land 88 and the first return channel 70, space B being an overlap between the first flow through and metering land 90 and the first flow through channel 72, and space C being a gap between the last mentioned land and channel. Corresponding spaces A′, B′ and C′ exist between the corresponding second lands and channels. The spaces A, B and C are proportioned so that C is greater than B and B is greater than A. Likewise C' is greater than B' and B' is greater than A'.

In operation it will be understood that there will be two situations. The first situation will consist of operation of the steering system when the lift system is also being operated, at which time pressure will exist in line 14 in the appropriate flow through channels 72 and 74, passage 106, and in line 18. The second situation will consist of operation of the power steering system when the lift system is not in operation, at which time there will be a flow of fluid through conduit 14, through the flow through passages, through conduit 18, the open center valve 20 and conduit 24 back to the reservoir. Under the second situation, there will be no effective pressure existing in the system. Actually, there may be a very slight back pressure existing therein.

Operation under the first situation is as follows: If the steering wheel is turned clockwise for a right hand turn the thrust of the right hand worm 36 will move the valve spool 78 to the left. This will result in first closing gap A' which connects the cylinder conduit 58 to the second return channel 76, and further movement will then reduce overlap B' to a point at which pressure fluid existing in flow through channel 74 will flow into the spool cylinder channel 104 located between lands 94 and 96. This fluid will enter conduit 58 and the left hand end of power steering cylinder 50, thereby moving the power steering cylinder 50 to the left and transmitting this motion through rod 54 to the steering linkage via the drag link 48. It will be understood that movement of the steering linkage 48 to the left will result in a turn to the right by the vehicle. Similarly, if a left hand turn is desired, the steering wheel 38 will be turned counterclockwise, whereupon the thrust of the worm 36 will cause movement of valve spool 78 to the right first closing gap A and secondly opening or tending to open gap B to permit pressure fluid and flow through channel 72 to enter conduit 56 via channel 98, said conduit leading to the right hand end of power steering cylinder 50. This will cause power steering cylinder 50 to move to the right, thereby transmitting its force and motion through rod 54 to the steering linkage via drag link 48, and will result in a left turn of the vehicle. It should be further understood that this motion of the steering linkage, which is connected to the sector 42, provides a follow-up motion which will continue as long as the steering wheel is being turned to maintain the valve in a displaced position. This follow-up action will cause the valve to move to a neutral position at any time that the continued motion of the steering wheel is terminated.

Operation under the second situation is substantially the same as in the first situation with the exception that, since no effective fluid pressure exists in the first and second flow through channels 72 and 74, because the lift is not in operation, the valve spool motion will be continued until overlap B or B' is completely opened and until gap C or C', as the case may be, begins to close. When the C or C' gap is closed the fluid in channel 72 or 74 will be restricted at a point which will create pressure in either conduit 56 or 58 without creating a corresponding pressure in the opposite conduit. If operation is initiated under situation two and then the lift cylinder is operated creating the first situation condition, the valve will simply back off sufficiently to enable overlap B or B' to be reestablished sufficiently to meter the required pressure into the steering cylinder. As in similar open center steering valves the pressure being transmitted to conduit 58 or 56 is also transmitted through drilled passages 108 and 110 respectively to reaction chambers 112 and 114 at the ends of the valves in order to provide a restoring force or feel on the steering wheel.

Although this invention has been described in connection with a specific embodiment, it will be obvious to those skilled in the art that various changes may be made in the form, structure and arrangement of parts without departing from the spirit of the invention. Accordingly the applicant does not desire to be limited to the specific embodiment disclosed herein primarily for purposes of illustration but instead desires protection falling within the scope of the appended claims.

Having thus described the various features of the invention, what I claim as new and desire to secure by Letters Patent is:

1. A closed center power steering control valve for use in series with an open center vehicle lift system comprising a housing having a bore therein, a valve member slidable in opposite directions from a normally neutral position within said bore, an inlet port, a return port, two cylinder ports, a flow through port, a first annular channel formed in said bore for communicating with said inlet port, second and third annular channels formed in said bore for communicating with said return port, a fourth annular channel formed in said bore, a fifth annular channel formed on said valve member by a first and second land for communicating with one of said cylinder ports, a sixth annular channel formed on said valve member by a third and fourth land for communicating with the other of said cylinder ports, a seventh annular channel formed on said valve member by said third land and a fifth land for communicating with said flow through port, an eighth annular channel formed on said valve member by said second and fifth lands, passage means formed in said valve member for communicating said fourth channel with said eighth channel, said valve member when in neutral position having an edge of each of said second and third lands spaced a first given distance from an associated edge of each of said first and fourth channels, the other edge of each of said second and third lands overlapping the other associated edge of each of said first and fourth channels a second given distance, and an edge of each of said first and fourth lands spaced a third given distance from an associated edge of each of said second and third channels, said first, second and third given distances being proportioned so that the first is greater than the second and the second is greater than the third.

2. A closed center power steering control valve for use in series with an open center vehicle lift system comprising a housing having an inlet port, a return port, first and second cylinder ports and a flow through port, a valve member movable in opposite directions from a normally neutral position within said housing for controlling flow of fluid between said ports, a first passage for communicating said inlet port with said flow through port and permitting free flow of fluid therebetween when said valve member is in neutral position, second and third passages communicating said first and second cylinder ports respectively with said return port, first and second lands formed on said valve member and associated with said second and third passages respectively for permitting flow therethrough when said valve member is in neutral position, fourth and fifth passages communicating said inlet port with said first and second cylinder ports respectively, third and fourth lands formed on said valve member and associated with said fourth and fifth passages respectively for preventing flow therethrough when said valve member is in neutral position, movement of said valve member away from said neutral position causing said first land to close said second passage, and third land to open said fourth passage subsequent to the closing of said second passage and close said first passage subsequent to the opening of said fourth passage if no effective pressure exists in said first passage, said second and fourth lands moving to permit increased flow between said second cylinder port and said return port.

3. A closed center power steering control valve for use in series with an open center auxiliary hydraulic system for a vehicle comprising a housing having an inlet port, a return port, two cylinder ports and a flow through port, a valve member movable in opposite directions from a normally neutral position within said housing for controlling flow of fluid between said ports, a first passage for communicating said inlet port with said flow through port and permitting free flow of fluid therebetween when said valve member is in neutral position, a second passage for communicating said cylinder port with said return port, a third passage for communicating said inlet port with said cylinder port, a first land formed on said valve member for permitting flow through said second passage when said valve member is in neutral position, a second land formed on said valve member for preventing flow through said third passage when said valve member is in neutral position, movement of said valve member away from said neutral position causing said first land to close said second passage, said second land to open said third passage subsequent to the closing of said second passage and close said first passage subsequent to the opening of said third passage, said first passage being closed off only if no effective pressure exists therein.

4. A closed center power steering control valve for use in series with an open center auxiliary hydraulic system for a vehicle comprising a housing having an inlet port, return port, two cylinder ports and a flow through port, a valve member movable in opposite directions from a normally neutral position within said housing for controlling flow between said ports, passage means for permitting free flow of fluid between said inlet port and said flow through port when said valve member is in neutral position, first means formed on said valve member for preventing flow of fluid between said inlet port and one of said cylinder ports but permitting flow of fluid between said one cylinder port and said return port when said valve member is in neutral position, second means formed on said valve member for preventing flow of fluid between said inlet port and the other of said cylinder ports but permitting flow of fluid between said other cylinder port and said return port when said valve member is in neutral position, movement of said valve member away from the normally neutral position causing said first means to sequentially close communication between said one cylinder port and said return port, open communication between said inlet port and said one cylinder port, and close communication between the inlet port and the flow through port if no effective pressure exists therebetween, said second means simultaneously moving to permit increased flow between said other cylinder port and said return port.

5. A closed center power steering control valve for use in series with an open center auxiliary hydraulic system for a vehicle comprising a housing having an inlet port, return port, two cylinder ports and a flow through port, a valve member movable in opposite directions from a normally neutral position within said housing for controlling flow between said ports, passage means for permitting free flow of fluid between said inlet port and said flow through port when said valve member is in neutral position, means formed on said valve member for preventing flow of fluid between said inlet port and said cylinder ports but permitting flow of fluid between said cylinder ports and said return port when said valve member is in neutral position, movement of said valve member away from the normally neutral position causing said last mentioned means to sequentially close communication between one of said cylinder ports and said return port, open communication between said inlet port and said one cylinder port, and close communication between the inlet port and the flow through port if no effective pressure exists therebetween.

No references cited.